Jan. 4, 1966   J. W. ERICKSON   3,227,928
PANEL CONSTRUCTION FOR CIRCUIT BREAKERS
Filed May 17, 1963   2 Sheets-Sheet 1
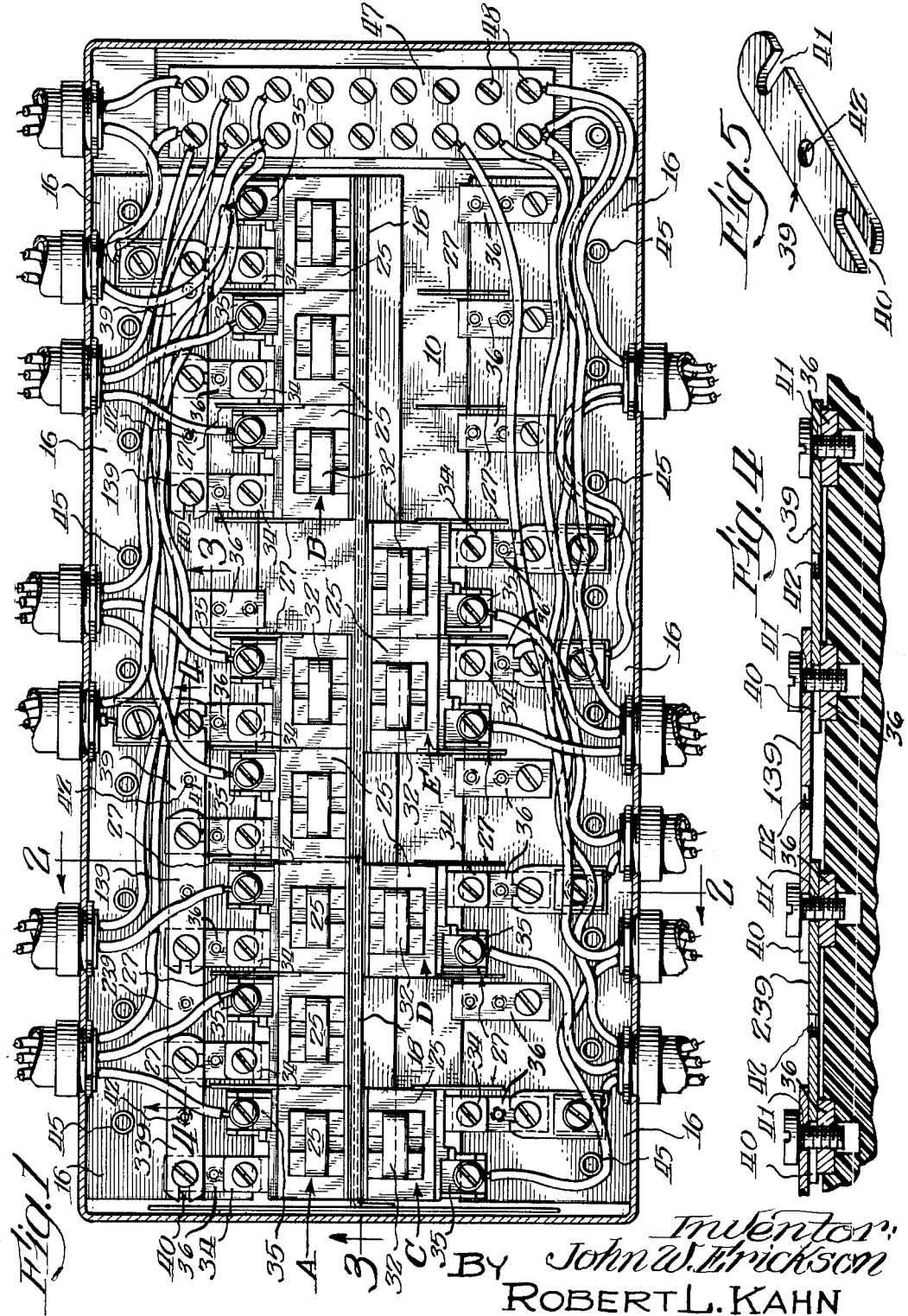
Inventor:
John W. Erickson
BY Robert L. Kahn
ATTY.

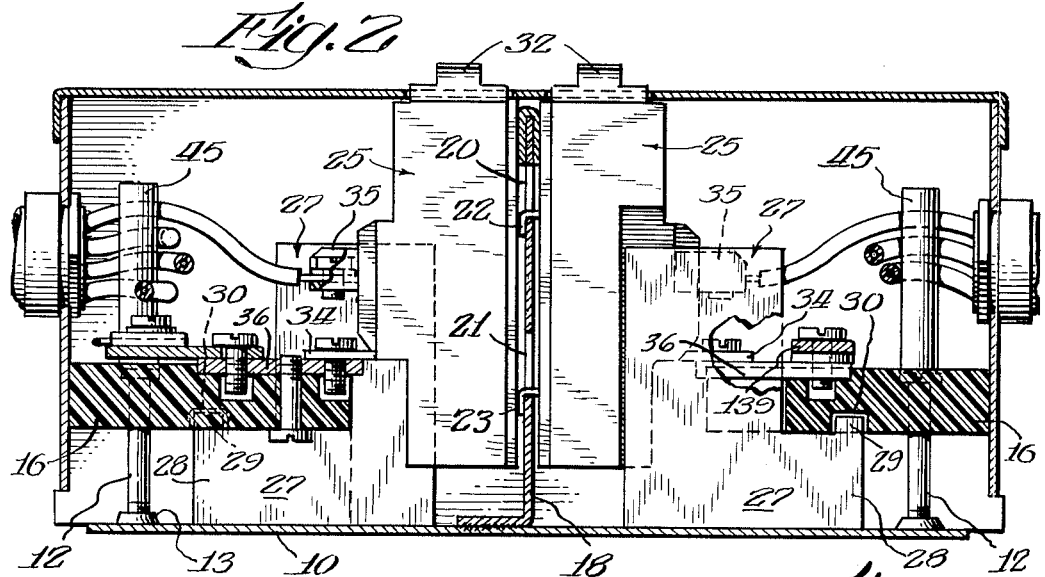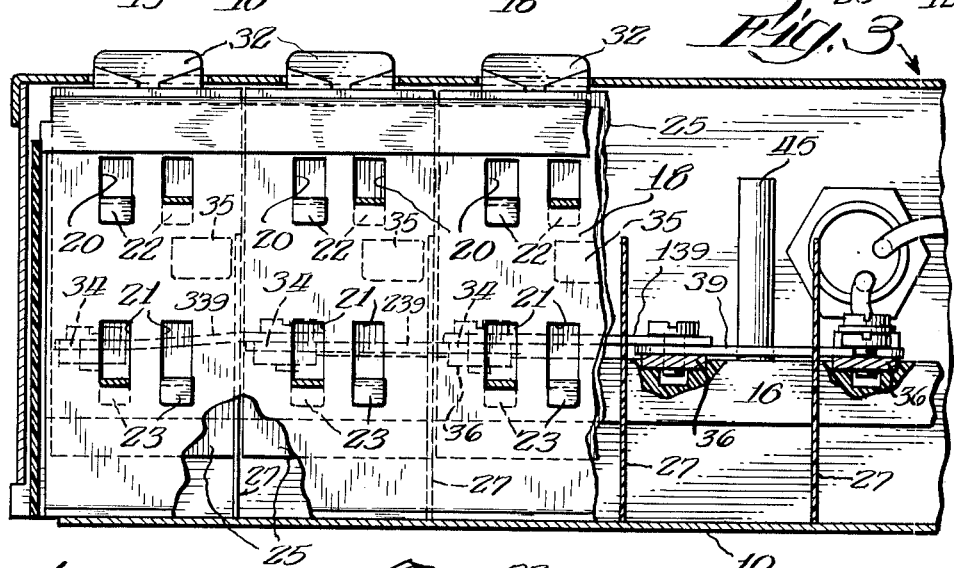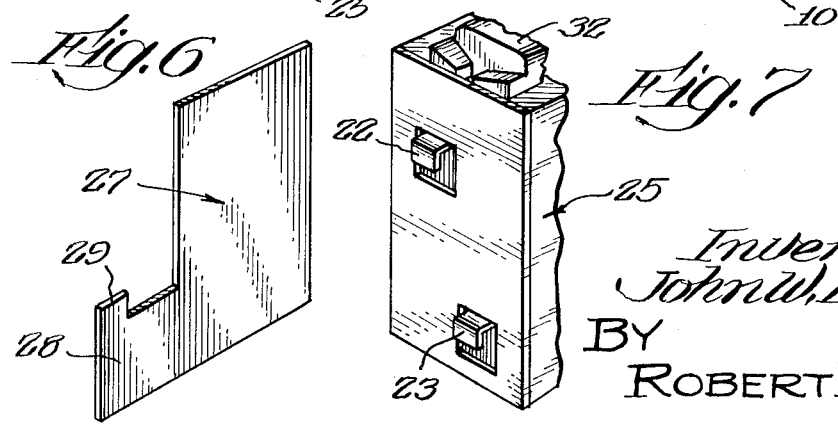

United States Patent Office 3,227,928
Patented Jan. 4, 1966

3,227,928
PANEL CONSTRUCTION FOR CIRCUIT
BREAKERS
John W. Erickson, Park Ridge, Ill. (% Erickson Electrical Equipment Co., 4460 N. Elston Ave., Chicago 30, Ill.)
Filed May 17, 1963, Ser. No. 281,222
3 Claims. (Cl. 317—119)

This invention relates to a panel construction for circuit breakers of the type where each has its line terminal at the front of the breaker so that in an array of circuit breakers, the various line terminals are arranged along a straight line. The invention is particularly concerned with a panel mounting for circuit breakers of the type disclosed in United States Patent No. 2,374,778, issued May 1, 1945, and the panel mounting therefor disclosed in United States Patent No. 2,428,320, issued September 30, 1947.

In these patents, circuit breakers are disclosed having means on a breaker housing for back-mounting the same on a support and each circuit breaker having line and load terminals extending from the front thereof. The line terminals are disposed at one level and the load terminals are disposed at another level. The customary arrangement of such circuit breakers is illustrated in FIGURE 4 of the referred Patent 2,428,320.

Panel boards having a multiplicity of circuit breakers mounted therein are use frequently in office buildings where a number of electric meters are connected between the power supply lines and the load circuits in a number of small offices. It frequently happens that a number of separate offices, having separate meters for separate tenants, may be consolidated into a suite requiring only one meter rather than individual meters for each office. While individual circuit breakers for each room or each circuit in such a suite are desirable, it is necessary to change the meter connections when a change in office arrangements occurs. Conversely, it is possible that a suite of offices has a number of different circuits with different breakers, all supplied through one meter. In such case, if the suite is broken up, individual rooms require individual meters and rewiring is necessary.

When any of the above changes occur—consolidating a number of meter circuits into one or conversely distributing a number of circuits formerly from one meter to a number of meters—the problem of making the changes in the panel is quite difficult. As Patent 2,428,320 referred to above discloses, it is customary to have a single straight bus bar run the length of a panel connected to each of the line terminals of a straight array of circuit breakers. Such a bus bar will be connected through a meter to a power supply line. The load terminals of the respective circuit breakers are connected to wires going to the particular load circuits controlled by the breakers.

This invention modifies the bus bar construction of the prior art by changing the single straight continuous bus bar for an array of breakers to a plurality of separate bus links which may be hooked together or separated as desired to form either one composite supply bus or form any desired number of separate line supply connections. Other details of structure are provided to take advantage of the flexibility of the invention.

In order that the invention may be understood, reference will now be made to the drawings wherein:

FIGURE 1 is a plan view with certain parts shown in section, illustrating a panel board embodying the present invention.

FIGURE 2 is a section on broken line 2—2 of FIGURE 1.

FIGURE 3 is a section on line 3—3 of FIGURE 1.

FIGURE 4 is a sectional detail on line 4—4 of FIGURE 1.

FIGURE 5 is a detail of one of the links making up the new bus bar.

FIGURE 6 is a perspective view of an insulating spacer between adjacent breakers.

FIGURE 7 is a perspective view of the rear of a breaker showing the attaching or mounting means.

The new panel includes base 10, of steel, carrying studs 12 extending outwardly therefrom and threaded into embossings 13 in base 10. Studs 12 are disposed along the length of panel 10 and support insulating blocks 16 of suitable rigid material having having good electrical insulating and fireproof properties. As illustrated in FIGURES 1 and 2, base 10 can accommodate two arrays of circuit breakers disposed in two straight lines in back to back relation. For this purpose, base 10 has central dividing partition 18, preferably of steel, extending from the base. Dividing partition 18 has two series of apertures 20 and 21 located to receive mounting hooks 22 and 23 of each circuit breaker, generally indicated by 25. It is understood that the breakers have the same physical dimensions.

Each insulating strip 16 is provided with transverse slots at spaced intervals for accommodating flat separator strips 27 having a generally L shape and made of electrically insulating material such as fiber, rubber or other material. The spacing between adjacent separators 27 is equal to the width of breaker 25. The shape of separator 27 is such that portion 28 of the separator extends beneath strip 16, with separator tip 29 terminating at groove 30 in the bottom of each insulating strip 16. The main body of separator 27 extends above strip 16 toward partition 18 and is located to provide a partition between the front parts of adjacent circuit breakers where the line and load terminals are located.

Circuit breaker 25 may have any desired construction and the type shown here has pushbutton part 32 disposed at the top of breaker 25 and adapted to be pushed downwardly successively to close or to open the breaker. The breaker mechanism itself may be of the type disclosed in Patent 2,374,778 referred to or may be of any other structure, this type of breaker being available on the market. Each circuit breaker 25 includes line terminal 34 and load terminal 35. Terminals 34 and 35 of the various breakers are disposed along two straight paths when the breakers are mounted on a panel, as illustrated in FIGURE 1, the line terminals being on a lower level than the load terminals. Each line terminal and each load terminal is normally apertured as illustrated in FIGURE 1 of Patent 2,374,778 and generally has the metal threaded to receive a connecting bolt. This however, is not essential.

Line terminals 34 are adapted to be connected to a source of electricity, usually the lines of an alternating current supply system, and these line terminals may be connected to the output side of an electric meter whose input is connected directly to the supply line. Load terminal 35 in each breaker is connected by individual wires to the respective load, which may be one or more circuits in one office (or more if desired).

Conventionally, a continuous bus bar would normally connect all line terminals 34 on one side of partition 18 and such bus bar would be connected to the alternating current power line. In accordance with the present invention however, individual power connections are made possible to the line terminals of an array of circuit breakers. Thus the line terminals of an array of breakers may be connected together or they may be connected separately, or two or more breakers may have the line terminals connected to one line and the remaining breakers on the same side of partition 18 may have their line terminals connected to the opposing line (this would be the live sides of a 230-volt line). Thus as illustrated in FIGURES 4 and 5, a number of links 39 are provided, each link having slots 40 and 41 and center aperture 42. Each link 39 is of copper or brass for good electrical conductivity and slots 40 and 41 are so arranged that adjacent line terminals of adjacent circuit breakers can be bridged together by one link. In other words, link 39 would have a length substantially equal to the distance between the line terminals of adjacent breakers. Aperture 42 is used for or can be used for attaching a link to insulating support member 16, or a screw or bolt may be disposed in aperture 42 and used for connecting a wire thereto if desired.

Each link is removably connected to one end of a connector member 36 mounted on the support member 16. The other end of each connector member 36 is positioned for connection to the line terminal 34 of a circuit breaker. Thus, the links 39, where present, interconnect the line terminals of the circuit breakers. The connector members 36 make it possible to span any gaps in the circuit breaker array.

As illustrated in FIGURE 4, the region along the series of circuit breakers may be bridged by successive links 39, 139, 239, and the like. Thus as shown in FIGURE 1 for example, group A is an array of five circuit breakers where conducting links 39 connect all of the circuit breakers in group A to a common line which could be connected to one meter or source of current. The separate load terminals 35 of each of these five circuit breakers however, will be individually connected to their respective loads. Thus in an office building, assuming that each room constitutes a load, this would correspond to a suite of five offices, the electricity of which goes through one common meter.

Continuing on in FIGURE 1, group B is an array of three circuit breakers with links connecting the same. These three circuit breakers will have their line terminals connected to a common meter and the load terminals will be connected to three different rooms. It should be noted that the three circuit breakers in group B need not be connected to the same side of a 230-volt line as the five breakers in group A. Thus the series of links in group B can be connected to one side of a 230-volt line, while the series of links in group A may be connected to the other side of the 230-volt line. It is understood of course, that the ground connections coming back are conventional and will go to the metal of the panel or to terminals specially provided for that.

Referring now to the lower groups of circuit breakers in FIGURE 1, individual breakers C and D each have their own separate connections to line wires and of course have their own individual separate connections to load wires. Group E consists of two circuit breakers side-by-side connected by one link and thus having a common line connection. The load for each breaker is different.

It is clear that the line connection for group E of the circuit breakers can be the same or can be opposite in polarity to breaker C or D. It is clear that in order to make a change in the meter connections, it is only necessary to change the links and either connect or disconnect various line terminals of various circuit breakers.

In order for wires to be threaded into and out of the cabinet containing panel, insulating posts 45 are disposed at spaced intervals along each of insulating supports 16. Preferably, although not necessarily, there may be one insulating post 45 for each circuit breaker so that a line or load wire, as desired, may be threaded around that.

The entire panel arrangement can follow customary procedure insofar as construction is concerned, other than as described above, and will have a removable cover for protecting the entire assembly of breakers and connections from outside dirt or interference. Grounding plate 47 having grounding terminals 48 is provided in accordance with conventional practice.

It is clear that circuit breakers may be readily removed and their positions changed or may be changed to breakers having a higher rating or lower rating, as desired, with a minimum of difficulty insofar as connections are concerned. Thus as tenants change in an office building or as circuit demands change, the circuit breakers may be easily rearranged so that changes in meter hookups can be easily provided.

What is claimed is:

1. A panelboard for mounting a plurality of circuit breakers to afford a service panel serving a number of different commercial or residential units in a single building, said panelboard comprising:

a housing including a base;

an elongated insulating support member mounted on said base;

means for mounting a plurality of individual circuit breakers of corresponding dimensions in a linear array adjacent said support member, each of said circuit breakers including a line terminal facing outwardly of said housing on the side of the breaker adjacent said support member;

a series of conductive connector members mounted on said support member at spaced intervals, the spacing between adjacent connector members corresponding to the width of a circuit breaker, each of said connector members being positioned for connection to the line terminal of one of said circuit breakers in said array to afford an extension of said line terminal onto said support member;

and a plurality of individual conductive connector links of substantially identical lengths, each removably connectible to an adjacent pair of said connector members, for forming a continuous line bus electrically connected to the line terminals of said circuit breakers and spanning any gaps in said array, selective removal and replacement of said connector links permitting grouping of said breakers in any desired combinations for separate metering purposes.

2. The construction according to claim 1 wherein a removable flat insulating partition is carried by said insulating support and positioned to isolate the front face of one breaker from that of adjacent breakers in an array.

3. The construction according to claim 2 wherein a plurality of insulating posts are provided, each insulating post being secured to said insulating support and positioned in front of each breaker station.

References Cited by the Examiner
UNITED STATES PATENTS

| | | | |
|---|---|---|---|
| 2,428,322 | 9/1947 | Robertson | 317—119 |
| 2,428,320 | 9/1947 | Platz | 317—119 |
| 2,943,244 | 6/1960 | Platz | 317—119 |
| 3,120,627 | 2/1964 | Herrmann | 317—119 |
| 3,144,587 | 8/1964 | Darlow | 317—119 |
| 3,168,684 | 2/1965 | Parmenter | 317—119 |

ROBERT S. MACON, *Acting Primary Examiner.*

JOHN F. BURNS, *Examiner.*

WILLIAM C. GARVERT, *Assistant Examiner.*